(No Model.)

C. E. HART.
DRIVE CHAIN COUPLING LINK.

No. 477,895. Patented June 28, 1892.

Witnesses
H. F. Gidding
A. B. Jenkins

Inventor
Charles E. Hart,
by Chas. L. Burdett
Attorney

UNITED STATES PATENT OFFICE.

CHARLES E. HART, OF NEW BRITAIN, CONNECTICUT, ASSIGNOR TO THE STANLEY WORKS, OF SAME PLACE.

DRIVE-CHAIN COUPLING-LINK.

SPECIFICATION forming part of Letters Patent No. 477,895, dated June 28, 1892.

Application filed February 1, 1892. Serial No. 419,870. (No model.)

*To all whom it may concern:*

Be it known that I, CHARLES E. HART, of New Britain, in the county of Hartford and State of Connecticut, have invented certain new and useful Improvements in Drive-Chain Coupling-Links, of which the following is a full, clear, and exact description, whereby any one skilled in the art can make and use the same.

My invention relates to the class of drive-chains that are made up of a number of separable links united by interengaging parts and that do not require the link to be separated in any of its parts in order to engage or disengage the several links in forming them into a chain, the links used in such chains, however, requiring that there shall be considerable slack equal about to the length of a single link to enable any two of the links to be disengaged; but there are some cases in which it is desirable after a driving-chain has been fixed upon the sprocket-wheels to separate the chain at some point without changing its tension.

The object of my invention is to provide a coupling-link that will enable a chain of this class to be readily separated by removing a bolt uniting the several parts of the link; and it consists in the details of the several parts making up the coupling-link as a whole and in their combination, as more particularly hereinafter described, and pointed out in the claim.

Figure 1:
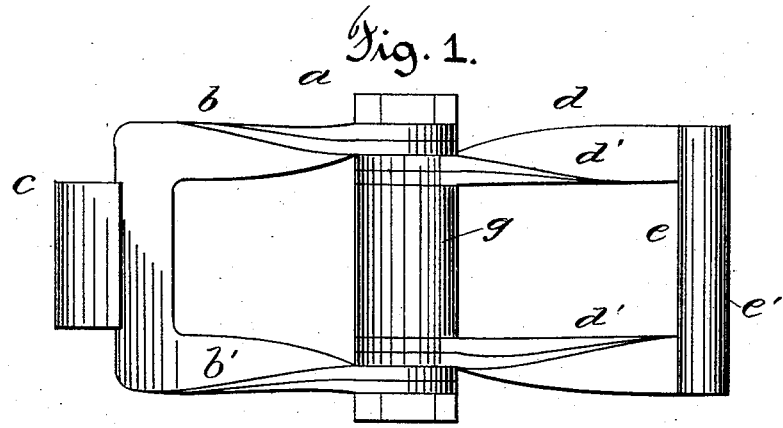
Figure 2:
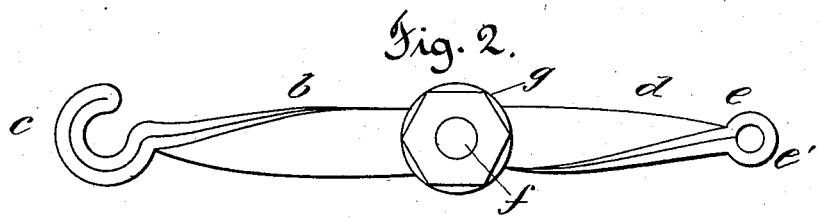
Figure 3:
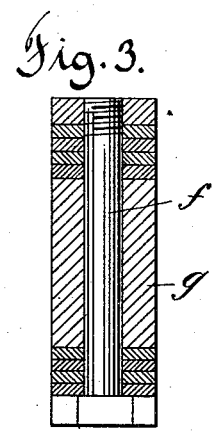

Referring to the drawings, Figure 1 is a detail plan view of the coupling-link. Fig. 2 is a detail edge view of the same. Fig. 3 is a detail view in cross-section of the link on a plane passing through the pivot.

In the accompanying drawings the letter $a$ denotes the coupling-link as a whole, made up of a U-shaped part $b$, that comprises a knuckle $c$, and a similar U-shaped part $d$, that comprises the pintle $e$. Each of these component parts of the coupling-link is preferably formed from a single sheet of metal folded upon itself, the fold coming at the outer end. For instance, the folded edge of that part $d$ that comprises the pintle $e$ has the folded edge at $e'$, the single part having a U shape, the side parts $d'$ being composed of a double thickness of metal folded down upon itself, and these parts are twisted so that the ends lie in a plane substantially at right angles to the plane of the link. These ends are preferably rounded and are provided with perforations, through which a pivot-bolt $f$ passes. In like manner the part $b$ has a folded edge at the knuckle end of the section, the side parts $b'$ extending substantially parallel to each other and terminating, preferably, in rounded ends, through which openings are also made for the passage of the pivot-bolt $f$. The side parts are twisted in order to throw the ends of this section into a plane at right angles to the plane of the link, so that the bolt passing through the several ends serves to unite them, a sleeve $g$ of a diameter substantially equal to the diameter of the knuckle being preferably located between the inner ends of the U-shaped sections of the link, the length of the sleeve being substantially equal to the length of the knuckle when such device is used. By this means of construction a link is formed in two sections pivotally connected to each other, so as to make them flexible in the plane of the link, and they are provided with openings to receive the teeth of the sprocket-wheel. The pivot-bolt $f$ extends completely through the end sections and the sleeve and is held in place by a nut or any other convenient means.

I claim as my invention—

In combination, in a coupling-link for a drive-chain, a knuckle-section formed of a single piece of metal folded into U shape, with a folded edge forming the edge of the knuckle and the inner ends bent at right angles to the plane of the link, with the opening through the ends for the passage of a pivot-bolt, a pintle-section formed of a single piece of metal folded into U shape, with the folded end forming a pintle and with the inner ends of the side parts of the frame bent at right angles to the plane of the link and having openings for the passage of a pivot-bolt, and the pivot-bolt extending transversely of the link through the ends of the link-sections and through the sleeve supported between these ends, all substantially as described.

CHARLES E. HART.

Witnesses:
CHAS. L. BURDETT,
A. B. JENKINS.